United States Patent
Brock et al.

(10) Patent No.: US 7,772,533 B2
(45) Date of Patent: Aug. 10, 2010

(54) MULTI-SENSOR IMAGE CAPTURE DEVICE

(75) Inventors: Chris Brock, Manorville, NY (US); David P. Goren, Smithtown, NY (US); Bradley Carlson, Huntington, NY (US)

(73) Assignee: Symbol Technologies, Inc., Holtsville, NY (US)

(*) Notice: Subject to any disclaimer, the term of this patent is extended or adjusted under 35 U.S.C. 154(b) by 77 days.

(21) Appl. No.: 11/526,448

(22) Filed: Sep. 25, 2006

(65) Prior Publication Data
US 2008/0073487 A1    Mar. 27, 2008

(51) Int. Cl.
*H04N 5/225* (2006.01)

(52) U.S. Cl. ............ 250/208.1; 348/47; 348/208.8

(58) Field of Classification Search ........... 359/618, 359/619; 348/224.1, 222.1, 208.8, 208.11, 348/218.1, 47; 250/208.1
See application file for complete search history.

(56) References Cited

U.S. PATENT DOCUMENTS

| 4,823,186 A * | 4/1989 | Muramatsu | 348/236 |
| 7,202,891 B1 * | 4/2007 | Ingram | 348/224.1 |
| 2004/0155968 A1 * | 8/2004 | Cheatle et al. | 348/207.99 |
| 2007/0052810 A1 * | 3/2007 | Monroe | 348/211.11 |
| 2008/0011857 A1 * | 1/2008 | Detwiler | 235/462.38 |

* cited by examiner

*Primary Examiner*—Tony Ko

(57) ABSTRACT

Described is a multi-sensor image capture device. The device comprises a first imaging sensor, a second imaging sensor and a light transfer arrangement receiving illumination reflected from an object and aiming the illumination at at least one of the first and second imaging sensors. The first imaging sensor generates first image data as a function of the illumination and the second imaging sensor generates second image data as a function of the illumination.

14 Claims, 5 Drawing Sheets

MULTI-SENSOR IMAGE CAPTURE DEVICE

FIELD OF INVENTION

The present invention generally relates to an image capture device having at least two sensors.

BACKGROUND

A conventional imager-based bar code scanner may utilize a color sensor to generate color images. The color images may be stored as digital photographs or processed for decoding. For example, a decoding algorithm may locate and decode dataforms (e.g., barcodes) in the color images.

The color sensor is typically comprised of a plurality of color filters disposed on a light-receiving surface of a monochrome sensor. Optical signals received by the scanner pass through the color filters and onto the monochrome sensor. The monochrome sensor generates data for each pixel, and the data is used by an image processing algorithm to generate a color image. However, the color image is substantially less decodable, because a signal strength of the optical signals incident upon the monochrome sensor has been significantly reduced by the color filters. Thus, there is a need for an arrangement that can generate color images and decodable images.

SUMMARY OF THE INVENTION

The present invention relates to a multi-sensor image capture device. The device comprises a first imaging sensor, a second imaging sensor and a light transfer arrangement receiving illumination reflected from an object and aiming the illumination at at least one of the first and second imaging sensors. The first imaging sensor generates first image data as a function of the illumination and the second imaging sensor generates second image data as a function of the illumination.

DETAILED DESCRIPTION

Figure 1:
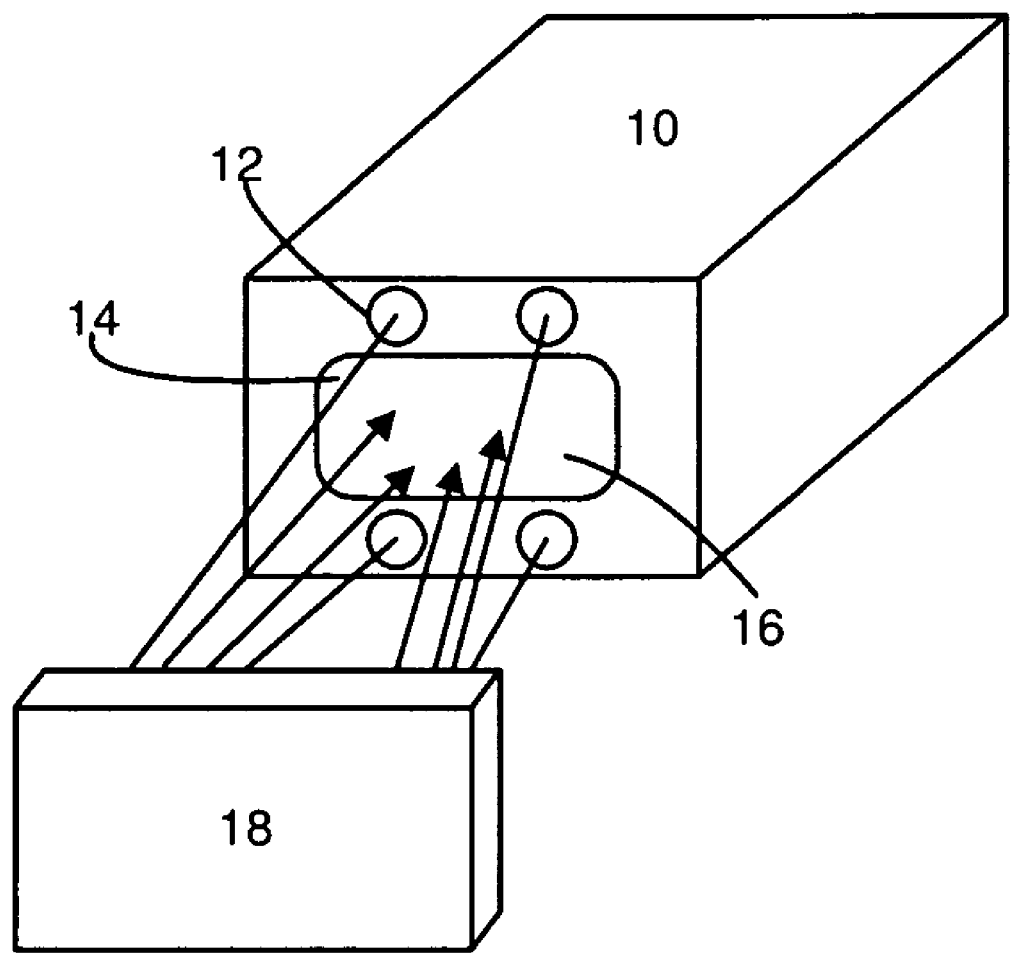
FIG. 1 shows an exemplary embodiment of an image capture device according to the present invention.

The present invention may be further understood with reference to the following description and the attached drawings, wherein like elements are referred to with the same reference numerals. The exemplary embodiments of the present invention describe an image capture device including a first sensor for generating color images and a second sensor for generating monochrome images. In this manner, the image capture device may be used for digital photography and dataform decoding. While the exemplary embodiments are described as including two sensors, those of skill in the art will understand that the device may utilize more than two sensors in other exemplary embodiments.

FIG. 1 shows an exemplary embodiment of an image capture device 10 according to the present invention. The device 10 may be a mobile computing unit (e.g., an imager-based scanner, a mobile phone, a PDA, a digital camera, a digital media player, a laptop, a handheld computer, etc.) or a stationary computing unit (e.g., a PC, a fixed-mounted scanner, a kiosk, etc.). When the device 10 is the mobile computing unit, image data generated by the device 10 may be processed either by the device 10 or by a remote computing arrangement coupled thereto. In the latter instance, the image data may be transmitted by the device 10 to the remote computing arrangement via a wired or wireless connection.

The device 10 may include an illumination arrangement comprising, for example, one or more light-emitting diodes (LEDs) 12 disposed around an image capture window 14 of the device 10. Illumination emitted by the LEDs 12 is typically synchronized to an image capture process executed by the device 10 so that the illumination reflected from an object 18 is used to generate an image thereof. The synchronization may also reduce or eliminate any noise in the image due to ambient light. The reflected illumination is focused by a lens 16 disposed in the image capture window 14 into an optomechanical assembly within the device 10. Those of skill in the art will understand that the device 10 may not include or utilize the LEDs 12 when, for example, the device 10 is used in an environment in which a level of ambient light is sufficient for the device 10 to generate an image of the object 18.

Figure 2:
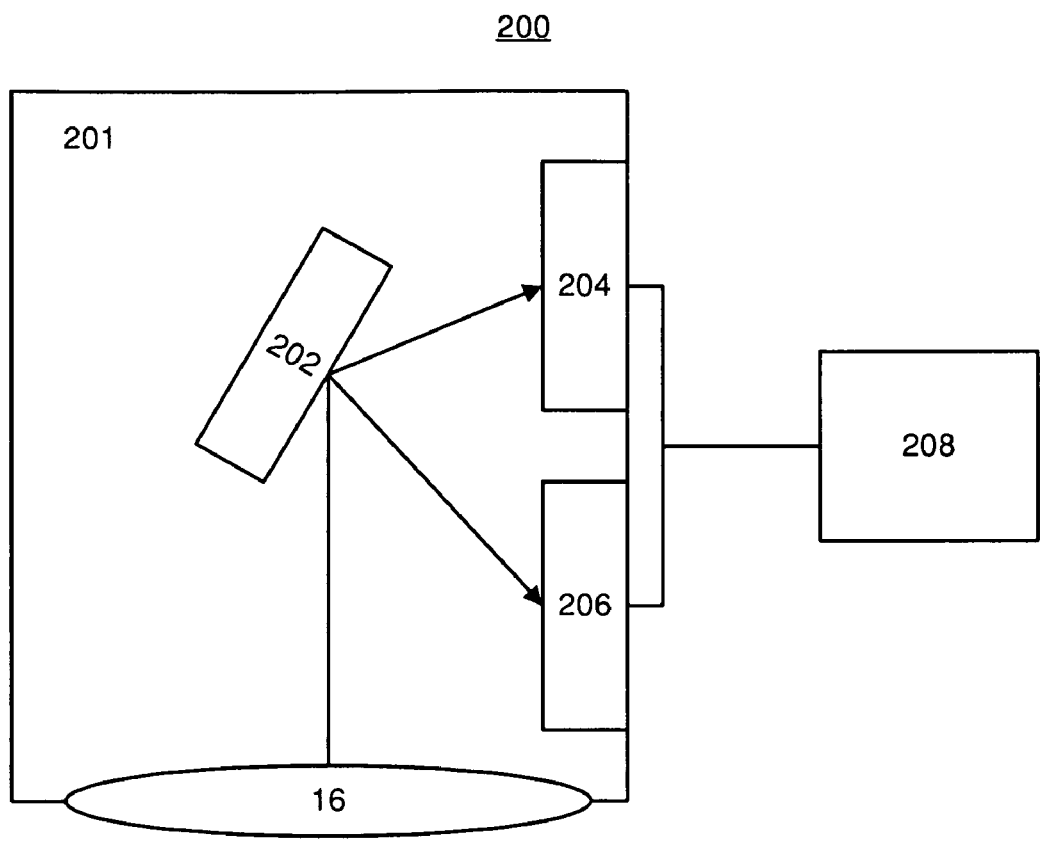
FIG. 2 shows an exemplary embodiment of an imaging system according to the present invention.

FIG. 2 shows an exemplary embodiment of an imaging system 200 according to the present invention. The imaging system 200 includes an optomechanical assembly 201 and a processing arrangement 208. The assembly 200 resides within the device 10 internal to the lens 16 and includes a light transfer arrangement (e.g., at least one mirror 202) for collecting the reflected illumination which passes through the lens 16. The mirror 202 may be pivotally disposed within the device 10 to focus the reflected illumination separately onto first and second sensors for generating first and second image data, respectively. The processing arrangement 208 may also be housed within the device 10 or in a housing and/or device separate therefrom. As will be explained further below, the processing arrangement 208 processes the first and/or second image data to generate first and/or second images which may be stored in a memory, displayed on a display screen, input to a decoder, etc.

The first sensor may be a color sensor 204 comprised of a plurality of color filters arranged in a predetermined pattern on a light-receiving surface of a photosensor(s). The color filters may be red-green-blue (RGB) filters and/or cyan-yellow-green-magenta (CYGM) filters. As understood by those of skill in the art, the color sensor 204 may utilize both luminance and chrominance components of the reflected illumination to generate the first image data, which the processing arrangement 208 may use to generate a color image of the object 18.

The second sensor may be a monochrome sensor 206 comprised of a photosensor(s) that outputs the second image data which the processing arrangement 208 may use to generate a monochrome image of the object 18. That is, the monochrome sensor 206 may only utilize the luminance component of the reflected illumination. Alternatively, the second image data may be composed of binary values indicating whether a single color is in an on- or off-state depending on an intensity value (e.g., measurement of luminance component) of the reflected illumination. Thus, the image generated from this image data would include portions which are green, amber, red or white (on state) and portions which are black (off-state).

The mirror 202 may pivot about an axis through a predetermined angular range which is determined based on positions of the lens 16, the color sensor 204 and the monochrome sensor 206. That is, the mirror 202 collects and aims substantially all of the reflected illumination onto the color sensor 204 and the monochrome sensor 206 separately. The axis may be transverse or longitudinal, or the mirror 202 may be coupled to a flexure or spring for orienting its reflecting face toward the color sensor 204 or the monochrome sensor 206.

In one exemplary embodiment, the mirror 202 may continually pivot through the angular range during the image capture process. Thus, the reflected illumination may be alternately focused on the color sensor 204 and the monochrome sensor 206 so that both the first and second image data may be generated. In this manner, the processing arrangement 208 may generate both color and monochrome images of the object 18. The color image may be stored as a digital photograph of the object 18, while the monochrome image may be input to a decoder for locating and decoding a dataform on the object 18.

The above-described embodiment may be useful in parcel tracking. For example, a user may be required to capture a digital photograph of the parcel and/or a shipping label thereon and scan a barcode on the shipping label. In the exemplary embodiment of the present invention, color and monochrome images of the parcel and/or the shipping label may be generated simultaneously using the first and second image data output by the color sensor 204 and the monochrome sensor 206, respectively. The color image may be stored in a memory, and the monochrome image may be processed by the decoder to decode the barcode.

In another exemplary embodiment, the mirror 202 may be pivoted to and maintained in a predetermined position based on, for example, a modality selected by a user of the device 10. For example, a user interface for the device 10 may indicate that the device 10 may be switched between first and second modes, e.g., a photo mode and a scanning mode, or implement both modes simultaneously. If the user selects the photo mode, the processing arrangement 208 may pivot the mirror 202 into a first predetermined position so that the reflected illumination is only focused onto the color sensor 204. If the user selects the scanning mode, the processing arrangement 208 may pivot the mirror 202 into a second predetermined position so that the reflected illumination is only focused onto the monochrome sensor 206.

Figure 3:
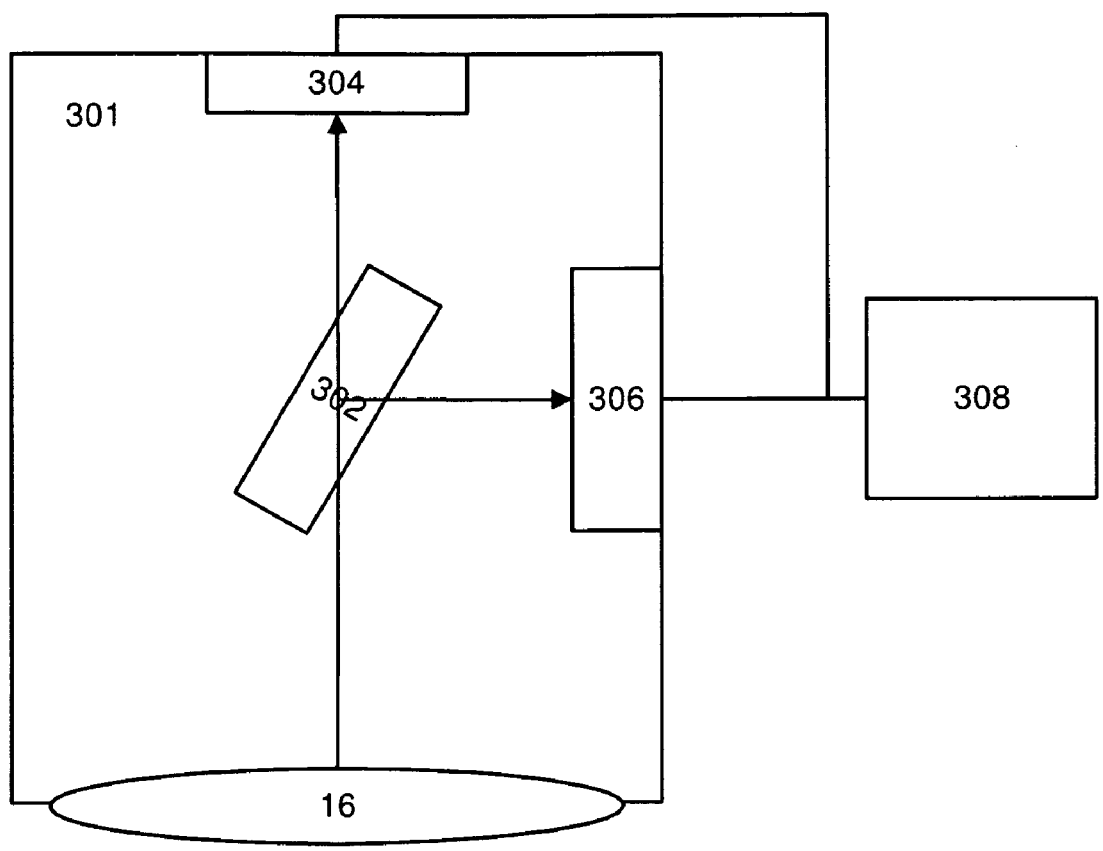
FIG. 3 shows another exemplary embodiment of an imaging system according to the present invention.

FIG. 3 shows another exemplary embodiment of an imaging system 300 according to the present invention. The imaging system 300 includes an optomechanical assembly 301 and a processing arrangement 308. In this exemplary embodiment, the assembly 300 includes a light transfer arrangement (e.g., a beam splitter 302) which transmits a portion of the reflected illumination onto a color sensor 304 and reflects a remaining portion of the reflected illumination onto a monochrome sensor 306. The beam splitter 302 may be immovably mounted in the device 10 and simultaneously transmit and reflect the reflected illumination. Those of skill in the art will understand that the locations of the color and monochrome sensors 304 and 306 may be determined based on a location of the beam splitter 302.

In one exemplary embodiment, the beam splitter 302 is comprised of two triangular glass prisms which are glued together at their respective bases using a resin (e.g., Canada balsam). A thickness of the resin may be adjusted such that half of the reflected illumination incident through one face of the cube is reflected and the other half is transmitted. Those of skill in the art will understand that the beam splitter 302 may be modified so that varying amounts of the reflected illumination are reflected and transmitted.

In another exemplary embodiment, the beam splitter 302 is a half-silvered mirror comprised of a plate of glass with a thin metallic coating of, for example, aluminum thereon. A thickness of the metallic coating may be adjusted so that, of light incident at a 45 degree angle, one half is transmitted to the color sensor 304 and the other half is reflected to the monochrome sensor 306. Instead of the metallic coating, a dielectric optical coating may be used. Similarly, a very thin pellicle film may also be used as the beam splitter 302.

Figure 4:
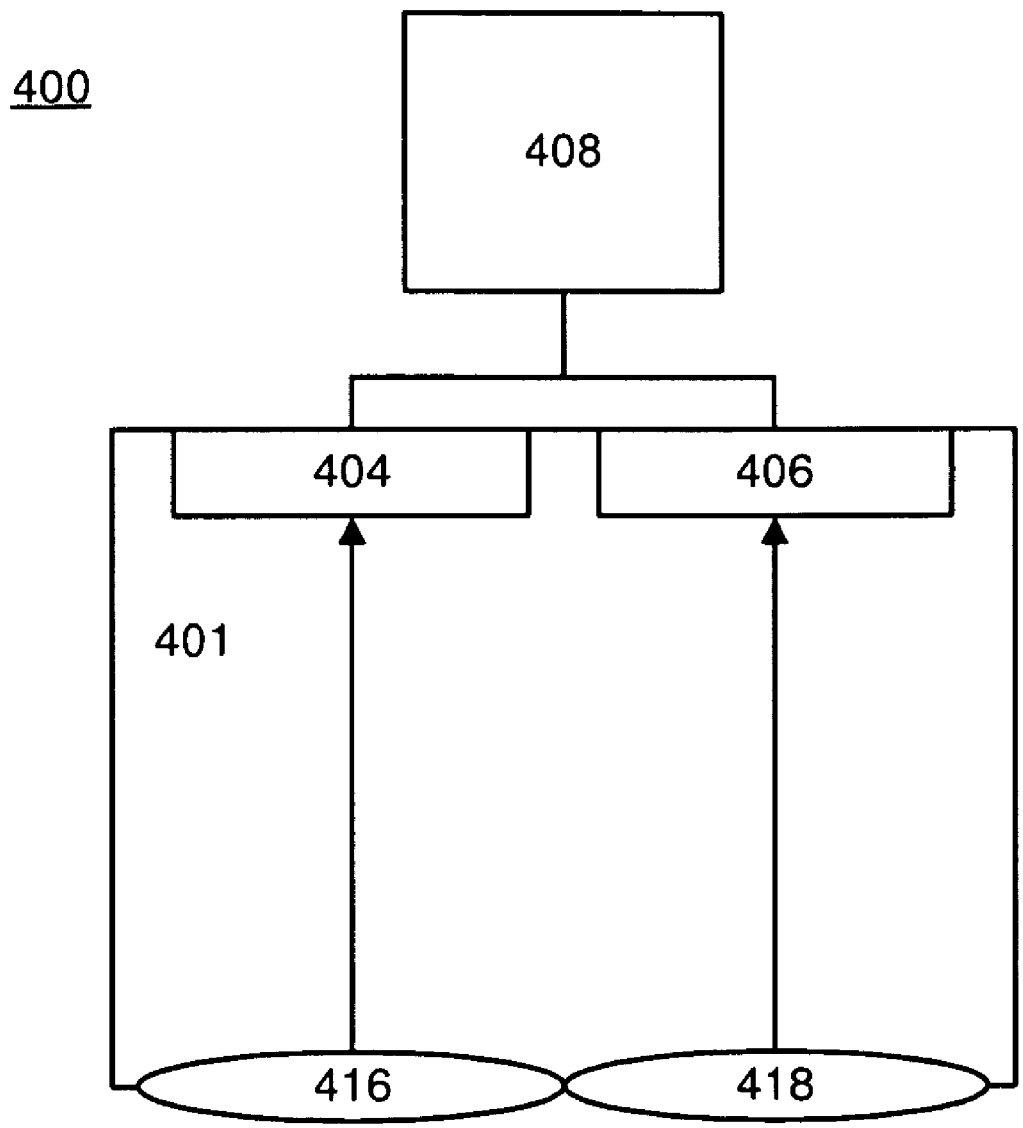
FIG. 4 shows a further exemplary embodiment of an imaging system according to the present invention.

FIG. 4 shows a further exemplary embodiment of an imaging system 400 according to the present invention. The imaging system 400 includes an optomechanical assembly 401 and a processing arrangement 408. In this exemplary embodiment, first and second lenses 416 and 418 are disposed within the image capture window 14 of the device 10. Aligned on substantially central axes of and internal to the lenses 416 and 418 are color and monochrome sensors 404 and 406, respectively. In this manner, the reflected illumination is simultaneously focused by each of the lenses 416 and 418 onto the respective sensors 404 and 406.

Those of skill in the art will understand that the assemblies 300 and 400 may be more robust than the assembly 200, because the assemblies 300 and 400 do not require any moving parts, while the assembly 200 utilizes the pivotable mirror 202. In addition, the assemblies 200 and 400 may provide a greater signal strength to the sensors relative to the assembly 300, because the beam splitter 302 in the assembly 300 divides the reflected illumination so that an incident signal strength on each of the sensors is half of the original signal strength of the reflected illumination.

Figure 5:
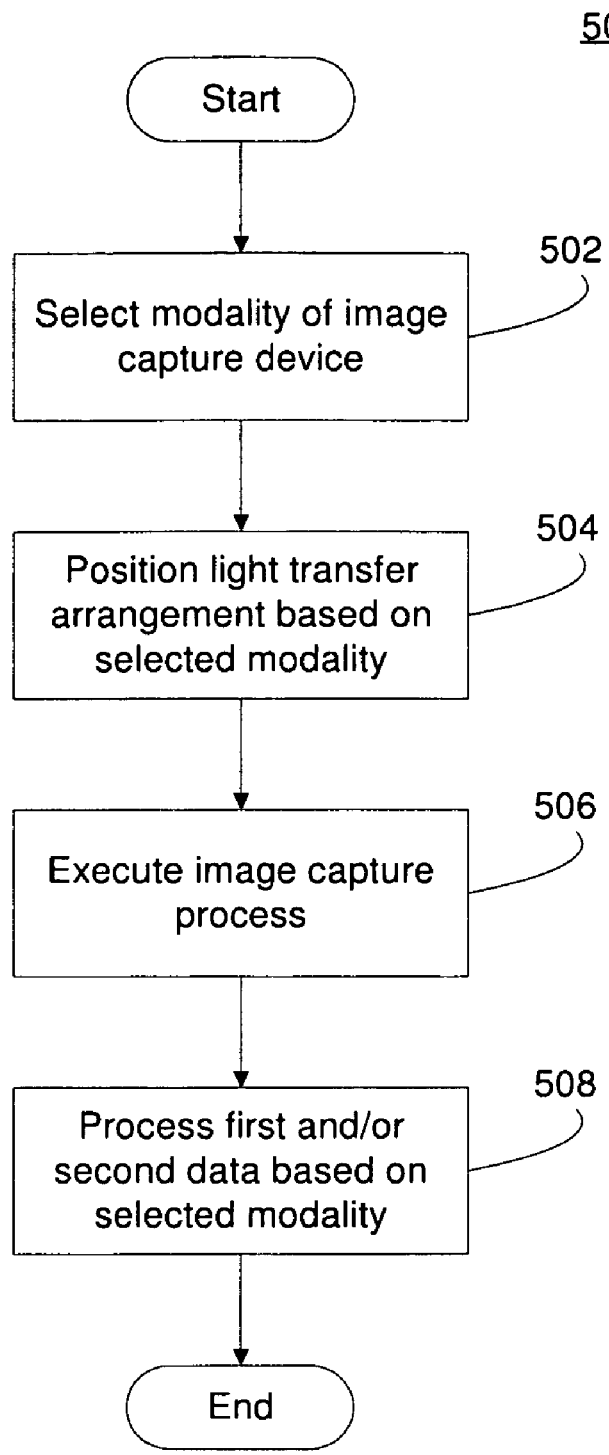
FIG. 5 shows an exemplary embodiment of a method according to the present invention.

FIG. 5 shows an exemplary embodiment of a method 500 according to the present invention which will be described with reference to the imaging system 200 but applies similarly to the imaging systems 300 and 400. In step 502, the modality for the device 10 is determined. As described above, the user of the device 10 may select either the photo mode or the scanning mode. In step 504, the processing arrangement 208 positions the light transfer arrangement based on the selected modality. For example, the mirror 202, may be pivoted to be aimed at the color sensor 204 or the monochrome sensor 206. However, if the user selects both the photo and scanning modes, the processing arrangement 208 may continually pivot the mirror 202 so that the reflected illumination is aimed alternately at the color and monochrome sensors 204 and 206.

In step 506, the device 10 executes an image capture process which may include, for example, pulsing the LEDs 12 to generate sufficient reflected illumination from the object 18. During the image capture process, the reflected illumination is focused by the lens 16 onto the mirror 202, and the mirror 202 redirects the reflected illumination onto the color sensor 204 and/or the monochrome sensor 206. In step 508, the processing arrangement 208 processes the first and/or second image data from the color and monochrome sensors 204 and 206, respectively. The processing arrangement 208 may select from the first and second image data based on the modality selected by the user. That is, in the photo mode, the processing arrangement 208 may process the first image data to generate a color image of the object 18.

The present invention has been described with the reference to the above exemplary embodiments. However, those of skill in the art will understand that various modifications and changes may be made to the embodiments without departing from the broadest spirit and scope of the present invention as set forth in the claims that follow. The specification and drawings, accordingly, should be regarded in an illustrative rather than restrictive sense.

What is claimed is:

1. A device, comprising:
a first color imaging sensor operative to generate first color image data;
a second monochrome imaging sensor operative to generate second monochrome image data;
a moveable light transfer arrangement receiving illumination reflected from an object and aiming the illumination at at least one of the first color imaging sensor and the second monochrome imaging sensor, wherein the first color imaging sensor generates the first color image data as a function of the illumination and the second monochrome imaging sensor generates the second monochrome image data as a function of the illumination;
wherein an angle of incidence between the received illumination from the object and the light transfer arrangement changes in response to a movement of the light transfer arrangement; and
a decoder receiving the second monochrome image data and configured for locating and decoding a dataform on the object in the second monochrome image data.

2. The device according to claim 1, wherein the light transfer arrangement is a mirror.

3. The device according to claim 2, wherein the mirror pivots relative to the first and second imaging sensors to be aimed at one of the first and second imaging sensors.

4. The device according to claim 1, further comprising:
a lens focusing the illumination onto the light transfer arrangement.

5. The device according to claim 1, further comprising:
a processing arrangement processing at least one of the first and second image data to generate at least one image.

6. The device according to claim 1, wherein the device is one of an imager-based scanner, a digital camera, a mobile phone, a PDA, a tablet computer, a handheld computer, a portable media player and a laptop.

7. A method, comprising:
receiving an indication of a selected modality for an image capture device, the image capture device comprising a first color imaging sensor operative to generate first color image data and a second monochrome imaging sensor operative to generate second monochrome image data, and wherein the image capture device further comprises a moveable light transfer arrangement;
positioning the light transfer arrangement as a function of the selected modality so that illumination reflected from an object is focused onto at least one of the first and second imaging sensors, and wherein an angle of incidence between the received illumination from the object and the light transfer arrangement changes in response to a movement of the light transfer arrangement; and
locating and decoding a dataform on the object in the second monochrome image data with a decoder that receives the second monochrome image data from the second monochrome imaging sensor.

8. The method according to claim 7, further comprising:
generating first image data as a function of the illumination by the first imaging sensor; and
generating second image data as a function of the illumination by the second imaging sensor.

9. The method according to claim 8, further comprising:
processing one of the first and second image data as a function of the selected modality.

10. The method according to claim 7, wherein the light transfer arrangement is a pivotable mirror.

11. A system, comprising:
an image capture device including a first color imaging sensor operative to generate first color image data and a second monochrome imaging sensor operative to generate second monochrome image data, and wherein the image capture device further comprises a moveable light transfer arrangement, the light transfer arrangement receiving illumination reflected from an object and aiming the illumination at at least one of the first and second imaging sensors, the first imaging sensor generating first image data as a function of the illumination and the second imaging sensor generating second image data as a function of the illumination;
a processing arrangement coupled to the image capture device, the processing arrangement processing at least one of the first and second image data to generate at least one image, and wherein an angle of incidence between the received illumination from the object and the light transfer arrangement changes in response to a movement of the light transfer arrangement; and
a decoder receiving the second monochrome image data and configured for locating and decoding a dataform on the object in the second monochrome image data.

12. The system according to claim 11, wherein the image capture device is one of an imager-based scanner, a digital camera, a mobile phone, a PDA, a tablet computer, a handheld computer, a portable media player and a laptop.

13. The system according to claim 11, wherein the light transfer arrangement is a mirror.

14. A device, comprising:
a first color imaging sensor operative to generate first color image data, wherein the first imaging sensor includes an array of detectors;
a second monochrome imaging sensor operative to generate second monochrome image data, wherein the second imaging sensor includes an array of detectors;
a moveable light transfer arrangement receiving illumination reflected from an object and aiming the illumination at at least one of the first color imaging sensor and the second monochrome imaging sensor, wherein the first color imaging sensor generates the first color image data as a function of the illumination and the second monochrome imaging sensor generates the second monochrome image data as a function of the illumination;
wherein an angle of incidence between the received illumination from the object and the light transfer arrangement changes in response to a movement of the light transfer arrangement; and
a decoder receiving the second monochrome image data and configured for locating and decoding a dataform on the object in the second monochrome image data.

* * * * *

UNITED STATES PATENT AND TRADEMARK OFFICE
CERTIFICATE OF CORRECTION

| | | |
|---|---|---|
| PATENT NO. | : 7,772,533 B2 | Page 1 of 1 |
| APPLICATION NO. | : 11/526448 | |
| DATED | : August 10, 2010 | |
| INVENTOR(S) | : Brock et al. | |

It is certified that error appears in the above-identified patent and that said Letters Patent is hereby corrected as shown below:

Column 6, Line 7, in Claim 10, delete "minor." and insert -- mirror. --, therefor.

Signed and Sealed this
Twenty-ninth Day of May, 2012

David J. Kappos
*Director of the United States Patent and Trademark Office*